(12) United States Patent
Maruyama et al.

(10) Patent No.: US 9,108,619 B2
(45) Date of Patent: Aug. 18, 2015

(54) CONTROL DEVICE FOR LOCKUP CLUTCH

(75) Inventors: Fumikazu Maruyama, Wako (JP); Hideyuki Yamanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 25 days.

(21) Appl. No.: 13/985,400

(22) PCT Filed: Feb. 20, 2012

(86) PCT No.: PCT/JP2012/053960
§ 371 (c)(1),
(2), (4) Date: Nov. 25, 2013

(87) PCT Pub. No.: WO2012/117880
PCT Pub. Date: Sep. 7, 2012

(65) Prior Publication Data
US 2014/0080671 A1   Mar. 20, 2014

(30) Foreign Application Priority Data
Mar. 1, 2011  (JP) .................. 2011-043567

(51) Int. Cl.
*B60W 10/02*   (2006.01)
*B60W 10/04*   (2006.01)
(Continued)

(52) U.S. Cl.
CPC ............. *B60W 10/026* (2013.01); *B60W 10/06* (2013.01); *F16H 61/143* (2013.01); *F16H 59/72* (2013.01); *F16H 59/78* (2013.01); *Y10T 477/73* (2015.01)

(58) Field of Classification Search
CPC .................... F16H 61/14; F16H 2061/1452
USPC ................ 192/82 T, 3.31, 3.28, 3.29, 103 F; 477/166, 174, 175, 176, 180, 902, 904; 701/67
See application file for complete search history.

(56) References Cited

U.S. PATENT DOCUMENTS 4,449,618 A    5/1984  Suga et al.
5,620,394 A *  4/1997  Iizuka ........................ 477/168
(Continued)

FOREIGN PATENT DOCUMENTS

CN    101922553 A    12/2010
EP    1 089 024 A2    4/2001
(Continued)

OTHER PUBLICATIONS

JP2005-030484 (machine translation)—Ueki (Jan. 20, 2005).*
(Continued)

*Primary Examiner* — Justin Holmes
*Assistant Examiner* — Tinh Dang
(74) *Attorney, Agent, or Firm* — Squire Patton Boggs (US) LLP (57) ABSTRACT

A control device for a lockup clutch is provided in which when control region determination device determines that a vehicle speed and an opening degree of an accelerator pedal are in the tight region of the lockup clutch, even if the water temperature of cooling water of the or the oil temperature of hydraulic oil of the transmission is less than a predetermined temperature, engagement permission device permits engagement of the lockup clutch. It is therefore possible to improve the fuel economy of the vehicle by increasing the frequency of engagement of the lockup clutch without affecting the function of the lockup clutch. The control device even functions when the lockup clutch is engaged at low temperatures, when the engagement responsiveness is low, because the oil temperature of the hydraulic oil is low and the viscosity is high.

3 Claims, 5 Drawing Sheets

(51) Int. Cl.
*F16H 61/14* (2006.01)
*B60W 10/06* (2006.01)
*F16H 59/72* (2006.01)
*F16H 59/78* (2006.01)

(56) References Cited

U.S. PATENT DOCUMENTS

| | | | |
|---|---|---|---|
| 5,643,136 | A | 7/1997 | Kono et al. |
| 5,722,912 | A * | 3/1998 | Narita ............................. 477/64 |
| 5,976,055 | A * | 11/1999 | Sasaki ............................. 477/64 |
| 6,537,178 | B1 * | 3/2003 | Takizawa et al. ............... 477/76 |
| 6,942,598 | B2 * | 9/2005 | Kondo et al. ................. 477/169 |
| 7,361,120 | B2 * | 4/2008 | Iida et al. ........................ 477/65 |
| 2009/0065318 | A1 * | 3/2009 | Soga et al. .................. 192/3.29 |
| 2010/0145584 | A1 * | 6/2010 | Kojima ............................ 701/68 |

FOREIGN PATENT DOCUMENTS

| | | |
|---|---|---|
| EP | 1 089 024 A2 | 4/2011 |
| JP | 03-260463 A | 11/1991 |
| JP | 06-100275 B2 | 12/1994 |
| JP | 11-101339 A | 4/1999 |
| JP | 2005-016616 A | 1/2005 |
| JP | 2005-030484 A | 2/2005 |
| WO | WO 2010/001665 A1 | 1/2010 |

OTHER PUBLICATIONS

JP2005-016616 (machine translation)—Iwamoto (Feb. 3, 2005).*
Supplementary European Search Report dated Sep. 22, 2014, issued in corresponding EP Application No. 12 75 2835.
International Search Report dated May 22, 2012 corresponding to International Patent Application No. PCT/JP2012/053960 and English translation thereof.
Official Communication dated Feb. 26, 2014 corresponding to Japanese Patent Application No. 2013-502246.
Official Communication dated Oct. 11, 2014 corresponding to Chinese Patent Application No. 201280008987.0.

* cited by examiner

CONTROL DEVICE FOR LOCKUP CLUTCH

TECHNICAL FIELD

The present invention relates to a control device for a lockup clutch that includes a lockup clutch of a torque converter disposed between an engine and a transmission, a temperature sensor that detects a water temperature of the engine or an oil temperature of the transmission, and engagement permission means that permits engagement of the lockup clutch when a temperature detected by the temperature sensor is at least a predetermined temperature.

BACKGROUND ART

Engagement of a lockup clutch is normally permitted when the water temperature of cooling water of an engine is at least 80° C. since, if the lockup clutch is engaged when the oil temperature of hydraulic oil of a transmission is low and the viscosity is high, there are problems such as vibration being generated due to engagement shock; an arrangement in which engagement of a lockup clutch is permitted when the water temperature is less than 80° C. but at least 60° C. and the oil temperature is at least 50° C. to thus increase the frequency of engagement of the lockup clutch and improve the fuel economy is known from Patent Document 1 below.

RELATED ART DOCUMENTS

Patent Documents

Patent Document 1: Japanese Patent Application Laid-open No. 2005-16616

SUMMARY OF INVENTION

Problems to be Solved by the Invention

In accordance with the invention of Patent Document 1 above, it is possible to improve the fuel economy by increasing the frequency of engagement of the lockup clutch, but in order to achieve further improvement of the fuel economy it is necessary to further increase the frequency of engagement without affecting the function of the lockup clutch.

The present invention has been accomplished in light of the above-mentioned circumstances, and it is an object thereof to further improve fuel economy by increasing the frequency of engagement of a lockup clutch without affecting the function thereof.

Means for Solving the Problems

In order to attain the above object, according to a first aspect of the present invention, there is provided a control device for a lockup clutch comprising a lockup clutch of a torque converter disposed between an engine and a transmission, a temperature sensor that detects a water temperature of the engine or an oil temperature of the transmission, and engagement permission means that permits engagement of the lockup clutch when a temperature detected by the temperature sensor is at least a predetermined temperature, characterized in that the device comprises control region determination means that determines whether or not the running conditions of a vehicle are in a tight region of the lockup clutch, and when the control region determination means determines that the running conditions of the vehicle are in the tight region, even if the temperature detected by the temperature sensor is less than the predetermined temperature, the engagement permission means permits engagement of the lockup clutch.

Further, according to a second aspect of the present invention, in addition to the first aspect, the running conditions of the vehicle are a vehicle speed and an opening degree of an accelerator pedal, and the control region determination means determines that the running conditions of the vehicle are in the tight region when the vehicle speed is a predetermined value or greater and the opening degree of the accelerator pedal is a predetermined value or greater.

A water temperature sensor Sa and an oil temperature sensor Sb of an embodiment correspond to the temperature sensor of the present invention.

Effects of the Invention

In accordance with the first aspect of the present invention, since, when the control region determination means determines that the running conditions of the vehicle are in the tight region of the lockup clutch, even if the water temperature of cooling water of the engine or the oil temperature of hydraulic oil of the transmission detected by the temperature sensor is less than a predetermined temperature, the engagement permission means permits engagement of the lockup clutch, it is possible to contribute to an improvement of the fuel economy by increasing the frequency of engagement of the lockup clutch. The reason is that in the tight region where the lockup clutch is completely engaged, the engagement responsiveness does not matter very much, and there is no problem even if the lockup clutch is engaged in a state in which the oil temperature of the hydraulic oil is low and the viscosity is high.

Furthermore, in accordance with the second aspect of the present invention, since the control region determination means determines the tight region when the vehicle speed is the predetermined value or greater and the opening degree of the accelerator pedal is the predetermined value or greater, it is possible to determine the tight region with good precision.

EXPLANATION OF REFERENCE NUMERALS AND SYMBOLS

TC Torque converter
LC Lockup clutch
Tw Water temperature of engine
To Oil temperature of transmission
Sa Water temperature sensor (temperature sensor)
Sb Oil temperature sensor (temperature sensor)
M2 Engagement permission means
M3 Control region determination means
V Vehicle speed
θ Opening degree of accelerator pedal

MODES FOR CARRYING OUT THE INVENTION

A mode for carrying out the present invention is explained below by reference to FIG. 1 to FIG. 5.

First Embodiment

Figure 1:
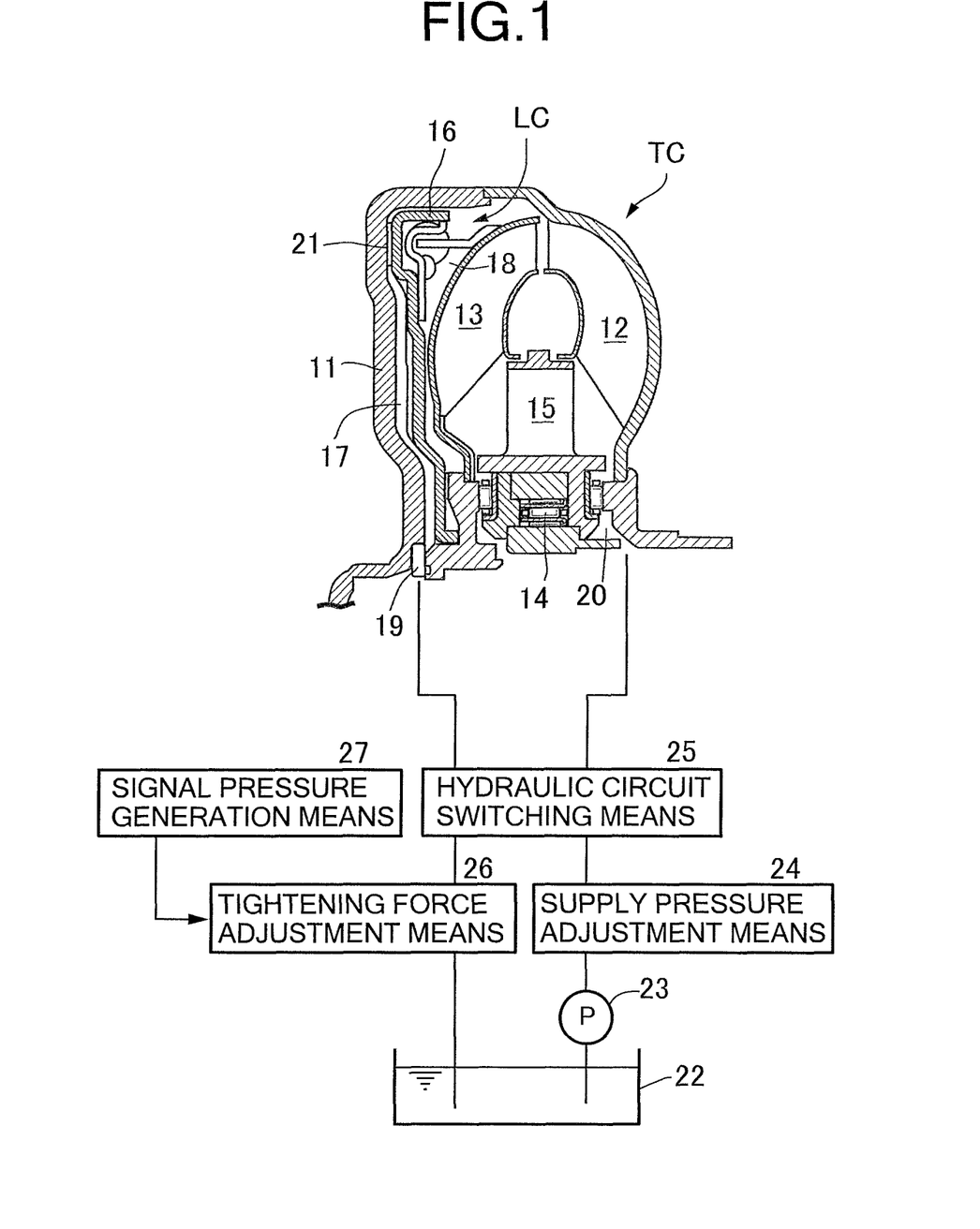
FIG. 1 is a view showing the structure of a torque converter. (first embodiment)

As shown in FIG. 1, a torque converter TC provided in an automatic transmission of an automobile includes an impeller 12 that is connected to a crankshaft (not illustrated) of an engine via a torque converter cover 11, a turbine 13 that is disposed so as to oppose the impeller 12 and is connected to an input shaft (not illustrated) of the transmission, and a stator 15 that is disposed between the impeller 12 and the turbine 13 and is supported on a fixing part via a one-way clutch 14. A lockup clutch LC that joins the impeller 12 to the turbine 13 includes a lockup piston 16 that is disposed in a space between a back face of the turbine 13 and the torque converter cover 11, the space being divided by the lockup piston 16 into a lockup release chamber 17 on the torque converter cover 11 side and a lockup tightening chamber 18 on the turbine 13 side. The lockup piston 16 can slide in the axial direction of the torque converter TC and can rotate together with the turbine 13.

The interior of the torque converter TC is filled with hydraulic oil supplied from a lockup release chamber inlet 19 and a lockup tightening chamber inlet 20, and when the impeller 12 is rotated by the crankshaft of the engine via the torque converter cover 11 to make the hydraulic oil circulate, the turbine 13 receives the dynamic pressure and is driven, and the input shaft of the transmission rotates. In this process, due to the action of blades of the impeller 12, the turbine 13, and the stator 15 the torque of the impeller 12 is amplified and transmitted to the turbine 13, but even under running conditions in which the impeller 12 and the turbine 13 rotate at the same speed, since power transmission is via hydraulic oil, it is impossible to avoid the occurrence of a certain degree of power transmission loss. Therefore, the lockup clutch LC is engaged to integrally join the impeller 12 and the turbine 13, and the occurrence of power transmission loss is thus avoided.

Engagement and disengagement of the lockup clutch LC is carried out by supplying an oil pressure selectively to the lockup release chamber 17 and the lockup tightening chamber 18. That is, when an oil pressure is supplied from the lockup tightening chamber inlet 20 to the lockup tightening chamber 18 a friction material 21 of the lockup piston 16 abuts against the torque converter cover 11 to thus engage the lockup clutch LC, and rotation of the crankshaft is transmitted directly to the input shaft via the torque converter cover 11 and the lockup piston 16. On the other hand, when an oil pressure is supplied from the lockup release chamber inlet 19 to the lockup release chamber 17 the friction material 21 of the lockup piston 16 becomes detached from the torque converter cover 11 to thus release engagement of the lockup clutch LC, and rotation of the crankshaft is transmitted to the input shaft via the torque converter cover 11, the impeller 12, the hydraulic oil, and the turbine 13.

A lockup clutch control device that controls engagement and disengagement of the lockup clutch LC includes a hydraulic pump 23 that supplies hydraulic oil within a hydraulic oil tank 22, supply pressure adjustment means 24 that adjusts the pressure of the hydraulic oil supplied from the hydraulic pump 23, hydraulic circuit switching means 25 that selectively supplies the pressure-adjusted oil pressure to the lockup release chamber 17 and the lockup tightening chamber 18, tightening force adjustment means 26 that controls the oil pressure supplied to the lockup release chamber 17, and signal pressure generation means 27 that generates a signal pressure for controlling the tightening force control means 26. Therefore, it is possible to control the oil pressure of the lockup release chamber 17 by the tightening force adjustment means 26, control the oil pressure of the lockup tightening chamber 18 by the supply pressure adjustment means 24, and carry out switching control of the supplied oil pressure by the hydraulic circuit switching means 25, thereby enabling the tightening force of the lockup clutch LC to be freely controlled.

In a state in which an oil temperature To of the hydraulic oil of the transmission is low, the viscosity of the hydraulic oil becomes high and operation of the lockup clutch LC becomes unstable, and it is therefore necessary to restrict engagement of the lockup clutch LC. Furthermore, in a state in which a water temperature Tw of cooling water of the engine before warming up is complete is low, the idling rotational speed is set high, and it is therefore necessary to restrict engagement of the lockup clutch LC. In this process, if engagement of the lockup clutch LC is restricted unnecessarily, it might cause degradation of the fuel economy, and it is therefore desirable to minimize restrictions on the engagement of the lockup clutch LC.

Figure 2:
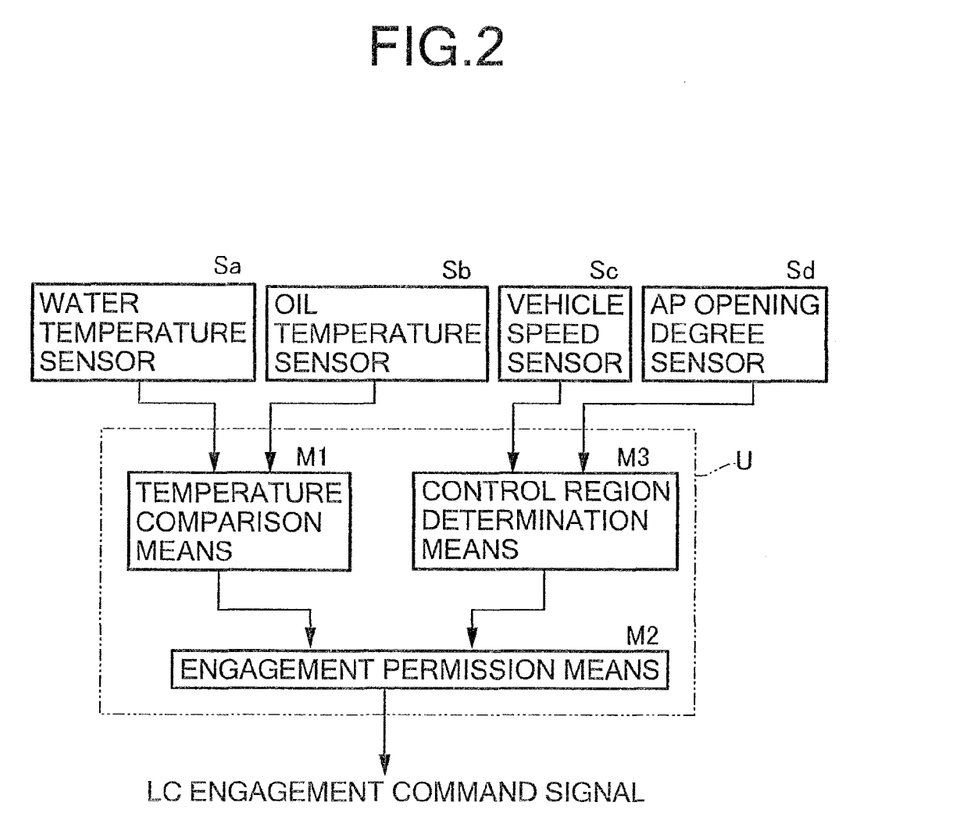
FIG. 2 is a block diagram of a control system. (first embodiment)

Because of this, in the present embodiment, as shown in FIG. 2, an electronic control unit U that controls engagement and disengagement of the lockup clutch LC includes temperature comparison means M1, engagement permission means M2, and control region determination means M3. Connected to the temperature comparison means M1 are a water temperature sensor Sa that detects the water temperature Tw of the cooling water of the engine and an oil temperature sensor Sb that detects the oil temperature To of the hydraulic oil of the transmission. Connected to the control region determination means M3 are a vehicle speed sensor Sc that detects a vehicle speed V and an accelerator pedal opening degree sensor Sd that detects an opening degree $\theta$ of an accelerator pedal.

Figure 5:
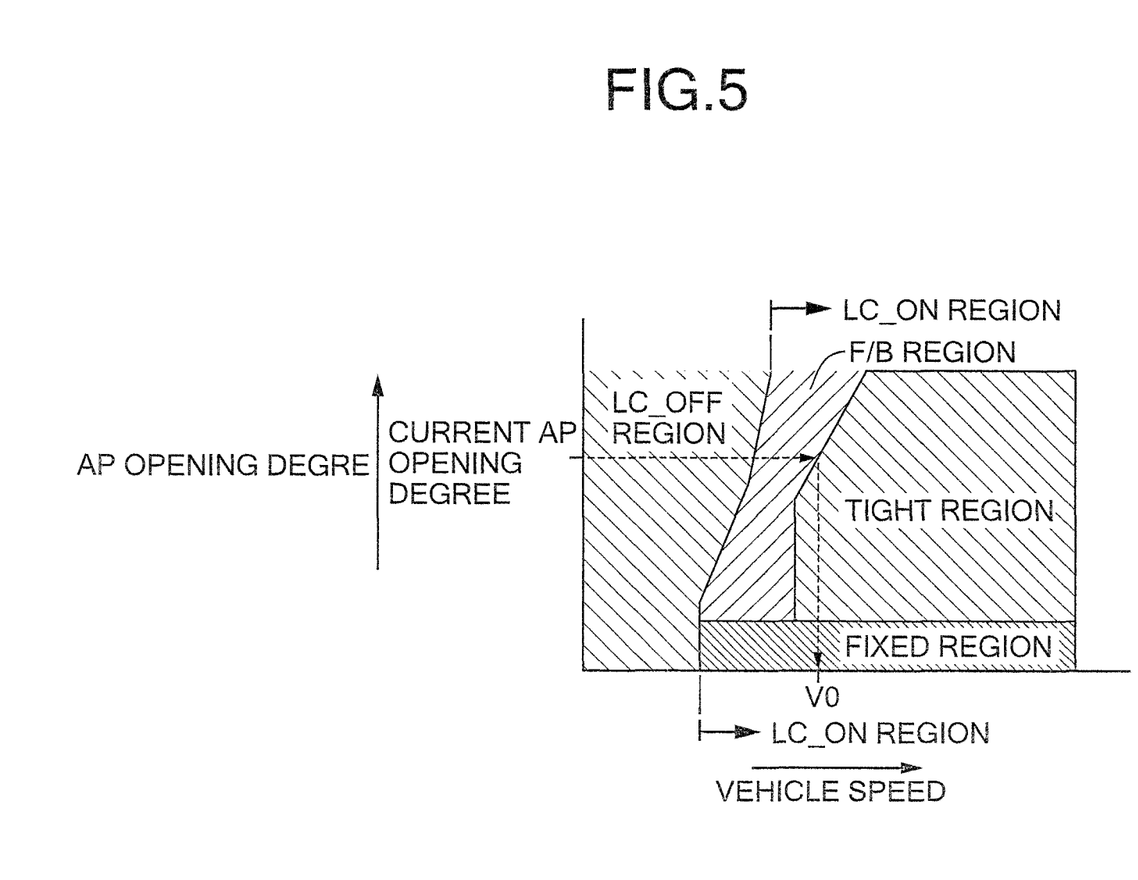
FIG. 5 is a diagram showing a map in which an ON region and a tight region of the lockup clutch are looked up. (first embodiment)

The temperature comparison means M1 compares the water temperature Tw and the oil temperature To with predetermined threshold values, and based on the results thereof the engagement permission means M2 permits engagement of the lockup clutch LC. The control region determination means M3 determines, based on the vehicle speed V and the opening degree $\theta$ of the accelerator pedal, a control region for controlling engagement of the lockup clutch LC, that is, a feedback region, a tight region, and a fixed region. As shown in FIG. 5, the feedback region is a region in which oil pressure supplied to the lockup clutch LC is subjected to feedback control so that the slip rate of the lockup clutch LC becomes a predetermined value. The tight region is a region in which oil pressure supplied to the lockup clutch LC is fixed to a maximum value so that the lockup clutch LC is completely engaged. The fixed region is a region in which there is no target slip rate, and feedforward control of supplying a precalculated oil pressure to the lockup clutch LC is carried out.

The operation is now explained in further detail by reference to FIG. 2 and the flowchart of FIG. 3.

Figure 3:
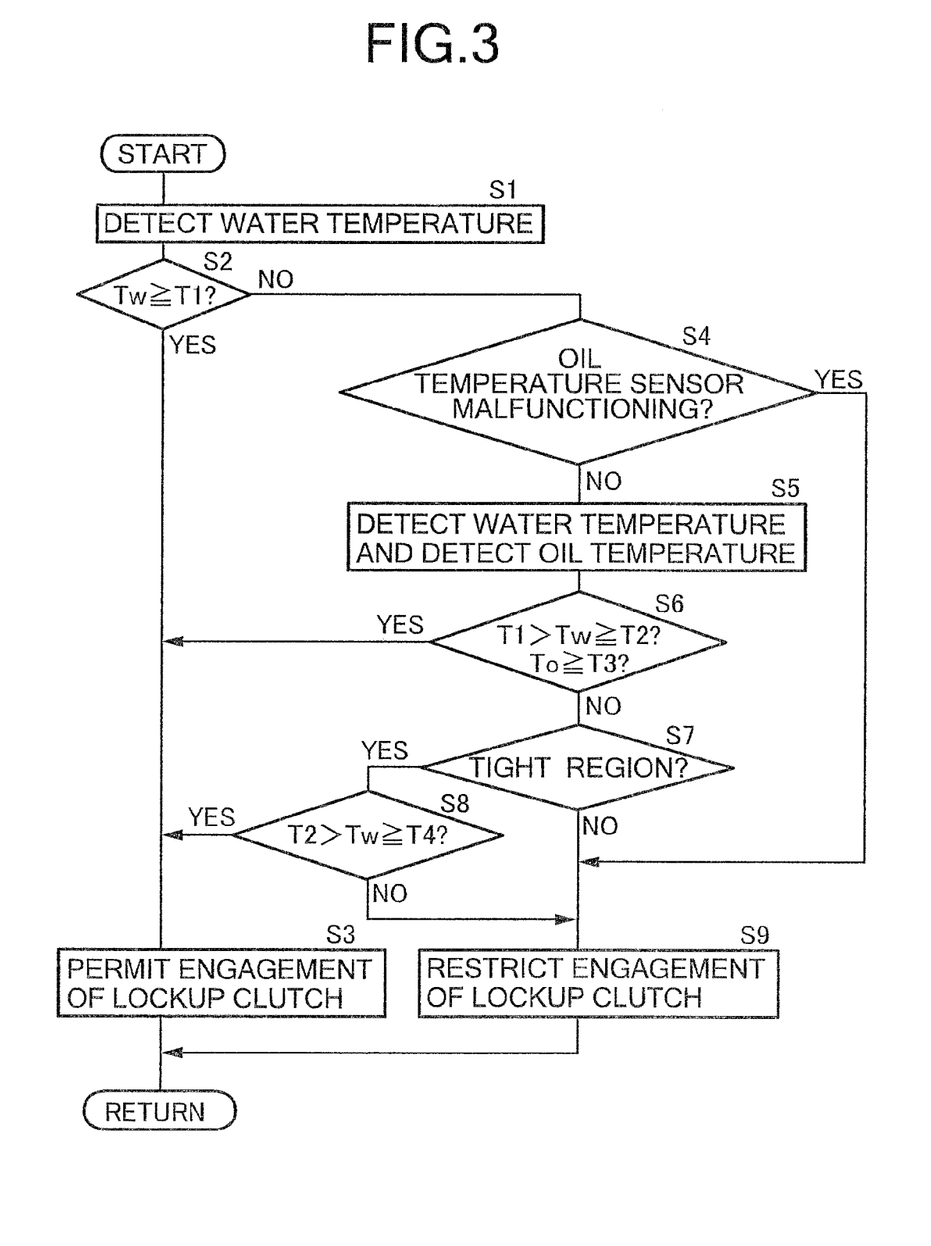
FIG. 3 is a flowchart of a main routine. (first embodiment)

First, in Step S1 of the main routine of FIG. 3 the water temperature Tw of the cooling water of the engine is detected by the water temperature sensor Sa, if in Step S2 the water temperature Tw is at least a first set temperature T1 (e.g. 80° C.), that is, warming up of the engine is completed or substantially completed and an idling rotational speed becomes low, it is determined that the running conditions of the engine are stabilized, and in Step S3 engagement of the lockup clutch LC is permitted.

If in Step S1 above the water temperature Tw is less than the first set temperature T1 and in Step S4 the oil temperature sensor Sb is not malfunctioning, then in Step S5 the water temperature Tw of the cooling water of the engine is detected by the water temperature sensor Sa, and the oil temperature To of the hydraulic oil of the transmission is detected by the oil temperature sensor Sb. If in Step S6 the water temperature Tw is less than the first set temperature T1 and at least a second set temperature T2 (e.g. 60° C.) and the oil temperature To is at least a third set temperature T3 (e.g. 50° C.), then in Step S3 above engagement of the lockup clutch LC is permitted.

At the second set temperature T2 (=60° C.), which is lower than the first set temperature T1 (=80° C.), the state is one in which warming up of the engine is not yet completed and the idling rotational speed is high to some degree. The third set temperature T3 (=50° C.) is a lower limit value of the oil temperature To that can give a viscosity of the hydraulic oil that is necessary for stable engagement of the lockup clutch LC, and if the oil temperature To is at least the third set temperature T3, the viscosity of the hydraulic oil becomes sufficiently low, and it becomes possible to prevent generation of vibration, etc. due to shock when the lockup clutch LC is engaged.

In this way, even in a state in which the idling rotational speed of the engine is slightly higher than the rotational speed after warming up is completed, that is, in a state in which the water temperature Tw is less than the first set temperature T1 and at least the second set temperature T2, when the oil temperature To is at least the third set temperature T3 and the viscosity of the hydraulic oil becomes sufficiently low, permitting engagement of the lockup clutch LC enables the frequency of engagement of the lockup clutch LC to be increased, thus improving the fuel economy.

If in Step S4 above the oil temperature sensor Sb is malfunctioning, since it cannot be confirmed whether or not the oil temperature To is at least the third set temperature T3, in Step S9 engagement of the lockup clutch LC is restricted.

In the case in which the answer in Step S6 above is NO and engagement of the lockup clutch LC is not permitted, in Step S7 it is determined whether or not the running conditions of the vehicle are in the tight region of the lockup clutch LC, and if they are not in the tight region, then in Step S9 above engagement of the lockup clutch LC is restricted. On the other hand, if in Step S7 above they are in the tight region and in Step S8 the water temperature Tw is less than the second set temperature T2 but at least a fourth set temperature T4 (e.g. 30° C.), then in Step S3 above engagement of the lockup clutch LC is permitted, and if the answer in Step S8 above is NO, then in Step S9 above engagement of the lockup clutch LC is restricted.

Since the tight region of the lockup clutch LC is a region in which the supplied oil pressure is fixed at a maximum value so that the lockup clutch LC is completely engaged, the engagement responsiveness thereof is hardly an issue, and there is therefore no problem even if the lockup clutch LC is engaged in a state in which the oil temperature To of the hydraulic oil is low and the viscosity is high.

Figure 4:
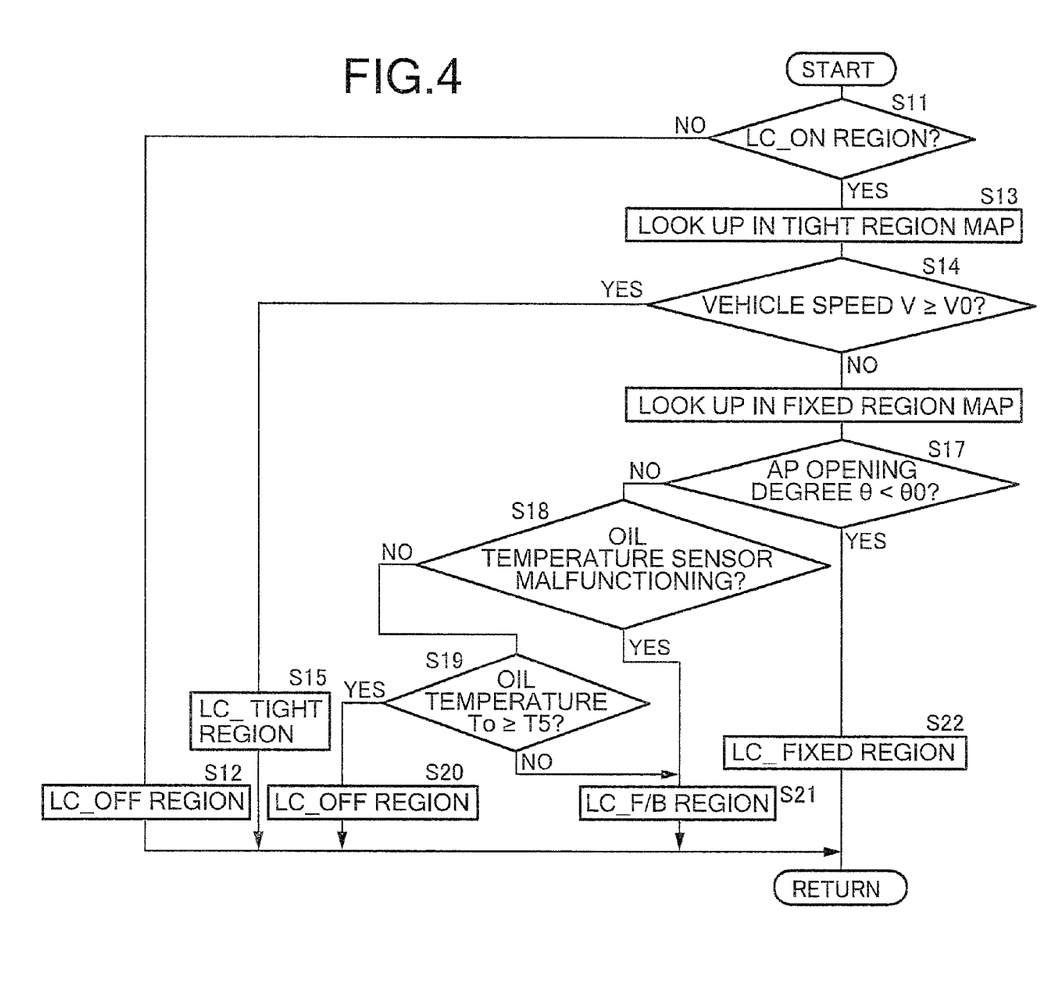
FIG. 4 is a flowchart of a subroutine of Step S9 of the main routine. (first embodiment)

Determination of the control region of the lockup clutch LC is now explained by reference to the flowchart of FIG. 4.

Determination of the control region of the lockup clutch LC is carried out while the vehicle is being accelerated. First, in Step S11, if not in an ON region (feedback region, tight region, and fixed region), in which the lockup clutch LC is engaged, then in Step S12 it is determined as being an OFF region, in which engagement of the lockup clutch LC is released. This determination is carried out based on the map shown in FIG. 5, in which the vehicle speed V and the opening degree θ of accelerator pedal are used as parameters.

If in Step S11 above they are in the ON region of the lockup clutch LC, then in Step S13 look up in the tight region map shown in FIG. 5 is carried out. The tight region map uses the vehicle speed V and the opening degree θ of the accelerator pedal as parameters, and the tight region is set where the vehicle speed V and the opening degree θ of the accelerator pedal are large. In Step S14 a lower limit vehicle speed V0 for the tight region with the current opening degree θ of the accelerator pedal is determined, and if the current vehicle speed V is at least the lower limit vehicle speed V0, then in Step S15 it is determined as being in the tight region.

If the answer in Step S14 above is NO, in Step S16 look up in the fixed region map is carried out, and if in Step S17 the current opening degree θ of the accelerator pedal is less than an upper limit opening degree θ0 of the accelerator pedal, then in Step S22 it is determined as being in the fixed region. When the answer in Step S17 above is NO, if in Step S18 the oil temperature sensor Sb is not malfunctioning and in Step S19 the oil temperature To is at least a fifth set temperature T5 (e.g. 140° C.), then in Step S20 it is determined as being in the OFF region, and if it is less than the fifth set temperature T5, then in Step S21 it is determined as being in the feedback region. Furthermore, if in Step S18 above the oil temperature sensor Sb is malfunctioning and the oil temperature To is unknown, a feedback region, which corresponds to a time of normal running and for which the running frequency is high, is selected. The reason that being in the OFF region is determined when the oil temperature To is at least the fifth set temperature T5 is because in a state in which the oil temperature To is at least the fifth set temperature T5 an oil pressure cannot be generated due to the specification of the transmission.

As described above, when the water temperature T is less than the second set temperature T2 (60° C.) but at least the fourth set temperature T4 (30° C.), engagement of the lockup clutch LC is conventionally restricted, but in the present embodiment engagement of the lockup clutch LC is permitted provided that the running conditions of the vehicle are in the tight region and the engagement responsiveness of the lockup clutch LC is not an issue, and it is therefore possible to contribute to an improvement of the fuel economy by increasing the frequency of engagement of the lockup clutch LC.

An embodiment of the present invention is explained above, but the present invention may be modified in a variety of ways as long as the modifications do not depart from the spirit and scope thereof.

For example, the first to fifth set temperatures T1 to T5 in the embodiment are only examples, and should not be construed as being limited thereto.

The invention claimed is:

1. A control device for a lockup clutch comprising
a lockup clutch of a torque converter disposed between an engine and a transmission,
a first temperature sensor that detects a water temperature of the engine,
a second temperature sensor that detects an oil temperature of the transmission, and
engagement permission means that permits engagement of the lockup clutch in a first case where the water temperature of the engine detected by the first temperature sensor is at least a first set temperature, a second case where the water temperature is less than the first set temperature and at least a second set temperature which is less than the first set temperature and the oil temperature of the transmission detected by the second temperature sensor is at least a third set temperature which is less than the second set temperature, or in a third case, vehicle speed detecting means detecting a vehicle speed, and control region determination means that determines whether or not the running conditions of a vehicle are in a tight region of the lockup clutch where the lockup clutch is completely engaged, wherein the vehicle speed detected by the vehicle speed detecting means is at least the predetermined value, and the control region determination means determines that the running conditions of the vehicle are in the tight region, even not in the first and second cases, the engagement permission means permits complete engagement of the lockup clutch.

2. The control device for a lockup clutch according to claim 1, wherein the running conditions of the vehicle are a vehicle speed and an opening degree of an accelerator pedal, and the control region determination means determines that the running conditions of the vehicle are in the tight region when the vehicle speed is the predetermined value or greater and the opening degree of the accelerator pedal is a predetermined value or greater.

3. The control device for a lockup clutch according to claim 1, wherein when the control region determination means determines that the running conditions of the vehicle are in the tight region in a state in which the water temperature of the engine detected by the first temperature sensor is less than the second set temperature but at least a fourth set temperature which is less than the second set temperature, the engagement permission means permits engagement of the lockup clutch.

\* \* \* \* \*